(12) United States Patent
Konuma

(10) Patent No.: US 6,479,938 B1
(45) Date of Patent: Nov. 12, 2002

(54) DRIVING METHOD FOR ELECTRIC-FIELD ELECTRON EMISSION APPARATUS

(75) Inventor: Kazuo Konuma, Tokyo (JP)

(73) Assignee: NEC Corporation, Tokyo (JP)

( * ) Notice: Subject to any disclaimer, the term of this patent is extended or adjusted under 35 U.S.C. 154(b) by 134 days.

(21) Appl. No.: 09/686,496

(22) Filed: Oct. 11, 2000

(30) Foreign Application Priority Data

Oct. 26, 1999 (JP) ............................................ 11-304386

(51) Int. Cl.⁷ ................................................ G09G 3/28
(52) U.S. Cl. ...................... 315/169.1; 315/505; 345/60
(58) Field of Search ........................ 315/169.1–169.4, 315/505; 313/364, 413, 414, 495; 345/60, 65, 164, 167

(56) References Cited

U.S. PATENT DOCUMENTS

| | | | | |
|---|---|---|---|---|
| 6,144,370 A | * | 11/2000 | Eleyan et al. ................ | 345/167 |
| 6,326,861 B1 | * | 12/2001 | Villa ............................ | 315/505 |
| 6,369,781 B2 | * | 4/2002 | Hashimoto et al. ........ | 315/169.1 |

FOREIGN PATENT DOCUMENTS

JP          10-261371          9/1998

* cited by examiner

Primary Examiner—Don Wong
Assistant Examiner—Wilson Lee
(74) Attorney, Agent, or Firm—Choate, Hall & Stewart

(57) ABSTRACT

A method for driving an electric-field electron emission apparatus without degrading the electron emission characteristics is provided. The method can drive the electric-field electron emission apparatus without degrading the electron emission characteristics by allowing application of the electric field only when the second derivative of the captured electron current density exceeds a certain value.

2 Claims, 6 Drawing Sheets

DRIVING METHOD FOR ELECTRIC-FIELD ELECTRON EMISSION APPARATUS

BACKGROUND OF THE INVENTION

1. Field of the Invention

The present invention relates to a driving method for an electric field electron emission apparatus.

2. Background Art

It is known that electron can be emitted efficiently from a carbon material called "carbonnanotubes". Efficient electron emission means herein that electrons are emitted by a low electric field and at a low threshold value.

Measurement of the electric field electron emission of the carbon nanotube yields the characteristic curve shown in FIG. 6. The measurement is carried out by applying a positive voltage to the anode electrode, located 1 mm apart from and facing a small piece of the carbon nanotube, which is fixed on a ground metallic cathode electrode. The result of the measurement is obtained by increasing the anode voltage from the ground potential to a certain maximum voltage and then decreasing from the maximum voltage to the ground potential.

In the above measurement, the anode voltage is increased and decreased at a rate of 10V per second. It was found in the measurement that the rate of increase of the electron current density tends to become saturated, and the region where the rate of increase of the electron current density tends to become saturated is referred to as the saturation tendency region. In this saturation tendency region, it was observed that the amount of emitted electrons is reduced during the application of a voltage. The above-described reduction means that the threshold of electron emission becomes higher, or that the amount of emitted electron decreases even when the same electric field is applied.

Since the electric potentials of both cathode and anode electrodes and the distance between the cathode and anode electrodes varies depending upon the type of the measurement apparatus, the voltage applied to the cathode electrode is called the electric field in this application. However, since a thin electron emitter is attached to the cathode electrode, the voltage applied to the cathode electrode can be used for expressing the potential bias between the electrode and the electron emitter.

When applying the electric field in the saturation tendency region, the reduction of the amount of emitted electrons becomes smaller as duration of application of the same electric field is shorter. The degradation of the electron emission characteristic becomes greater when the period of application of the voltage is the same but the electric field is higher. In contrast, when the electric field is below the saturation tendency region, the electron emission characteristic is very small and insignificant. As indicated above, the problem has been found that the electron emission characteristics are degraded in the saturation tendency region.

The degradation of the electron emission characteristics in the saturation tendency region is also observed in various materials. For example, it was found in a micro-filed emitter array using a spinto-type molybdenum cone that its electron emission characteristics show a tendency to saturate significantly departing from the Fauler-Nordheim function. In this saturation tendency region, it was observed that the electron emission characteristics are remarkably degraded. The same degradation was observed in DLC (diamond like carbon) and in the DLC material treated by hydrogen plasma or the like.

SUMMARY OF THE INVENTION

It is therefore the object of the present invention to provide a method first for driving an electric field electron emission apparatus which emits electron by electric field emission from the cathode electrode and captures electrons at the anode electrode, wherein the electric field applied to the cathode electrode is higher than that for generating the field emission and lower than the electric field in which the second derivative of the density of the electron current (hereinafter called the electron current density) to be captured at the cathode electrode with respect to the cathode electrode becomes 0 for the first time after the electric field is applied.

In this case, it is possible to prevent degradation of the electron emission characteristic by not driving the electron emission apparatus in the saturation tendency region, by mathematically recognizing that the electric field is in the saturation tendency region of the electron emission characteristic. In the normal electron emission region, the amount of emitted electrons increases faster than the increase of the applied field, that is, the second derivative of the electron emission increases in the positive region.

In the second method of driving the electron emission apparatus, in which electrons are emitted from the cathode electrode and are captured at the anode electrode, wherein the electric field applied to said cathode electrode is higher than the electric field for generating the field emission of electrons, and the second derivative of the density of the electron current (hereinafter, called the electron current density) captured by the anode electrode for the electric field is higher than the electric field in which the second derivative becomes 0 for the first time after the electric field is applied, and wherein the period of time during which the electric field is applied to the cathode electrode satisfies the following two equations:

$$t_{ap} = T/|A|$$

$$E_{st} \leq E$$

where,

T: a numeral value within a range higher than $1 \times 10^{-9}$ and lower than $1 \times 10^{-6}$ [sec·cm$^{-2}$·V$^{-2}$·A], A: the second derivative of the electron current density [A·cm$^{-2}$·V$^{-2}$], E: the electric field applied to the cathode electrode, and Est: the minimum electric field in a saturation tendency region, wherein, the minimum electric field in the saturation tendency region is the electric field at which a change of the electron current density changes from an increase to a decrease.

A BRIEF DESCRIPTION OF THE DRAWINGS

DETAILED DESCRIPTION OF THE INVENTION

Figure 1:
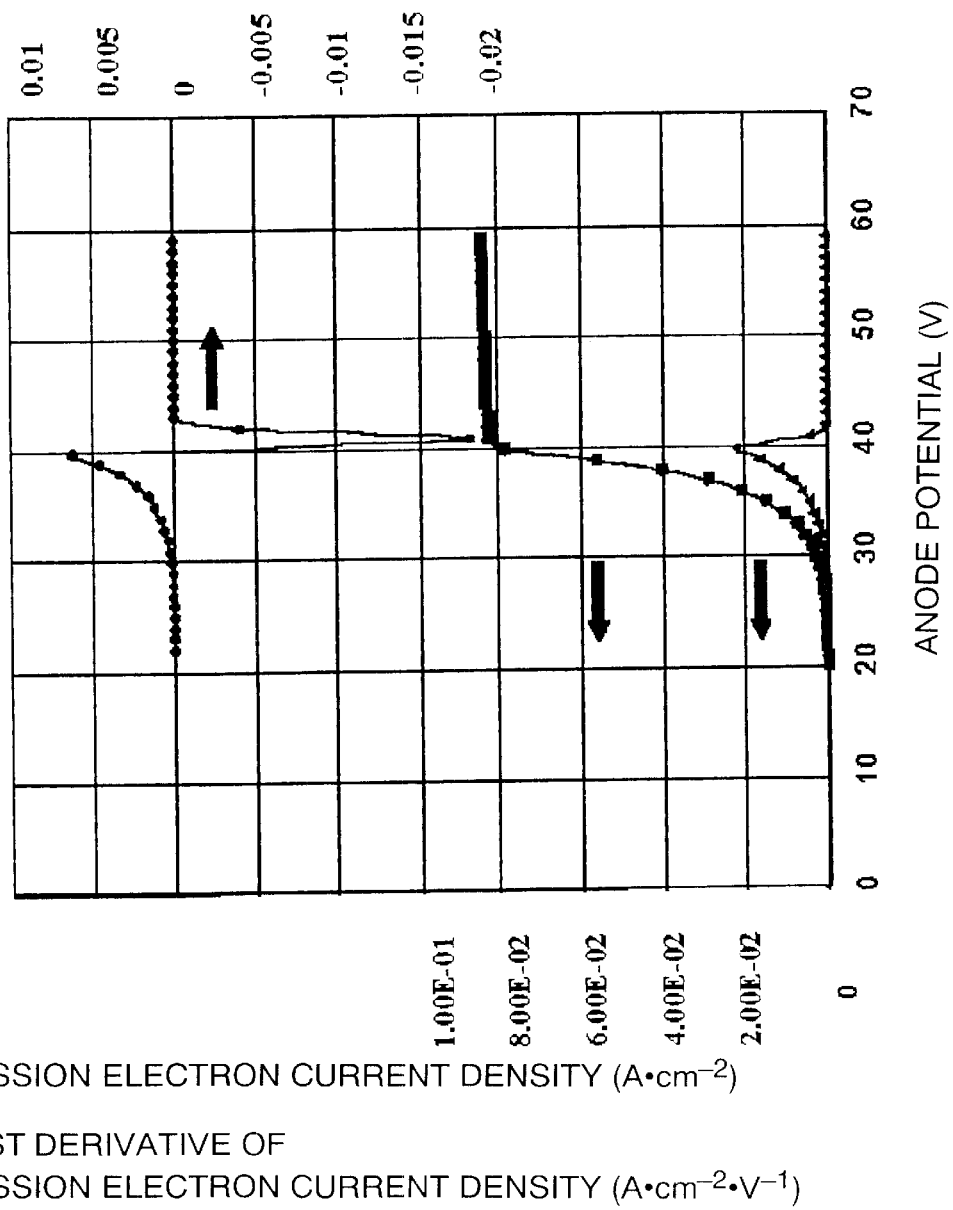
FIG. 1 is a diagram showing the potential current density characteristic according to the first and third embodiments of the present invention.

The first embodiment of the present invention is described with reference to FIG. 1. FIG. 1 illustrates the electron emission characteristics obtained by driving this electron emission apparatus wherein a carbon nanotube is attached to the cathode electrode and the anode electrode is disposed at a position at a distance of 10 $\mu$m from the nanotube. FIG. 1 is a graph showing the electron emission characteristics as the anode electrode current obtained when the cathode electrode is grounded and the positive potential is applied to the anode electrode. No anode electrode current is obtained when the anode electrode potential is less than 20V. When the anode potential exceeds 20V, the anode electrode current increases with increasing anode electrode potential. The anode electrode current tends to become saturated, that is, the saturation tendency region is observed, when the anode potential exceeds 41V.

In FIG. 1, the curves obtained by the first derivative and the second derivative of the above-described anode electrode current density are shown together. Since the anode electrode current density is increasing when the potential is higher than 20V, all of the first derivative of the electron emission property in a region above 20 V for the anode electrode current density are positive. In contrast, the second derivative becomes negative near 41 V where the anode electrode current density becomes saturated. The first embodiment of the present invention detects the region where the second derivative become negative and then obtains the lowest potential value in the negative second derivative for determining the highest driving potential for driving the electric field electron emission apparatus.

The relationship between the potential applied to the anode and the electric field will be described in order to explain the scope of the present invention in terms of the structure of the first embodiment. That is, when a potential difference of 20V is applied to between two parallel electrodes forming the cathode and anode disposed to each other at a distance of 10 $\mu$m from each other, an electric field of 2 V/$\mu$m, or 2×10$^6$V/m is applied, which corresponds to the potential difference between the cathode and the anode.

In the following description, the potential applied to the anode may be used sometimes for expressing the electric field, but the electric field can be obtained if necessary by the use of the above relationship on the premise that the distance between two electrode plates is 10 $\mu$m, and the cathode potential is zero. From the above relationship, 41 V in the above description indicates an electric field of 4.1×10$^6$V/m.

An additional experiment carried out when the cathode and anode electrodes are spaced at a distance of 20 $\mu$m indicates that electron emission starts from the gate potential of 40V. The above experiment shows that the electric field of 2V/$\mu$m obtained from the calculation formula of 40V/20 $\mu$m is the threshold for the electron emission. This threshold value is the same as that obtained in the case of 10 $\mu$m. The electron emission property of the carbon nanotube showed the same electric field in every case where the cathode and anode are spaced at a distance of more than 1 $\mu$m.

The method of driving the field electron emission apparatus according to the first embodiment is characterized in that the absolute value of the anode electrode current density does not constitute the factor for determining the upper limit of the deriving voltage. The upper limit driving voltage is determined by the second derivative. The reason for this is because it was found that the degradation of the electron emission property is not related to the current density of the electron emission property but related to the saturation dependency of the electron emission property.

An experiment carried out for a nanotube sample prepared by coating a nanotube powder mixed with a paste material after pulverization by an ultrasonic pulverizer at a vibration frequency of 20 kHz showed that, although there is a difference in the absolute value of the current density, the same saturation tendency is observed. This tendency is clearly shown in the second derivative curve of the electron emission property. The electron emission (anode current) is observed at the higher anode voltage than the threshold value, and beyond this threshold value, the second derivative of the current density increases gradually with an increase of the anode voltage and starts decreasing suddenly from the positive value region to the negative value region below 0.

In the saturation dependency region, the second derivative reaches the minimum value as the electric field increases, and after this, the second derivative increases in the negative value region (that is, the second derivative approaches 0). This characteristic is the same as that shown in FIG. 1. The above-described characteristic indicates that the minimum electric field in the region where the second derivative is equal to or below 0 is the minimum applied electric field in the saturation tendency region.

When the electric field is continuously applied in this saturation tendency region, the electron emission continues, but the amount of electron emission gradually decreases or degrades with time. This decrease is caused by the degradation of the emission characteristic of the carbon nanotube emitter. When the electric field is below the saturation tendency region, the degradation of the electron emission characteristic does not occur. The degradation of the emission characteristic can be commonly prevented for both pulverized or block carbon nanotube material by the use of the second derivative which is closely related to the saturation tendency region.

In the above experiment, the saturation tendency region is defined as "the region which exceeds the minimum applied field in the region of the applied field in which the second derivative is equal to or less than 0. This definition is explained below in detail.

The experimental results showed slightly different results when the experimental vacuum conditions or the operating ambient temperatures are changed. When the degree of vacuum decreases, that is, when the residual gas increases, the amount of electron emission fluctuates even when the applied field is maintained constant. The general experimental vacuum condition is that the degree of vacuum is at a level of 10$^{-5}$ Pa (or 10$^{-7}$ Torr) and the main component of the residual gas is hydrogen. When the degree of vacuum is at a level of 10$^{-4}$ Pa (or 10$^{-6}$ Torr) and the main component of the residual gas is Argon, and when the emission current is observed, the fluctuation of the emission current is abruptly observed as a rapid increase or decrease of the emission current.

That is, the results shown in FIG. 1 are obtained by measuring and averaging the amount of emission at respective electric fields for around 100 times. If the measurement at one electric field is carried out for one time while varying the electric field, the measurement results indicates that the amount of electron emission decreases despite the electric field increases. For the case that the highest amount of electron emission within a fluctuation range is observed at a low applied field and when the lowest amount of emission is observed at a high electric field, this reverse relationship may be observed when the applied electric field is not appropriately selected. However, this phenomenon is related to the time dependence of the amount of electron emission and is not directly related to the saturation tendency which is the subject of the present application.

The above-described time dependency can be settled by averaging a plurality of measured values for one electric field, that is, the time dependency can be cleared by averaging about 100 measured points for one electric field. In this experiment, 100 points were sufficient for eliminating the time dependent effect.

In a specific application such as an FED (Field Emission Display), sometimes it is difficult to measure 100 points for averaging. In such cases, the electric field dependency of the electron emission amount is obtained in advance, and the saturation tendency region and the electric field of the saturation tendency region is recognized from the above electric field dependency of the electron emission amount to be supplied to the actual operation of such a display. The electric field dependency of the electron emission characteristic can be obtained by carrying out the measurement a necessary number of times for respective electric field during intervals when no display operation is actually carried out.

Figure 2:
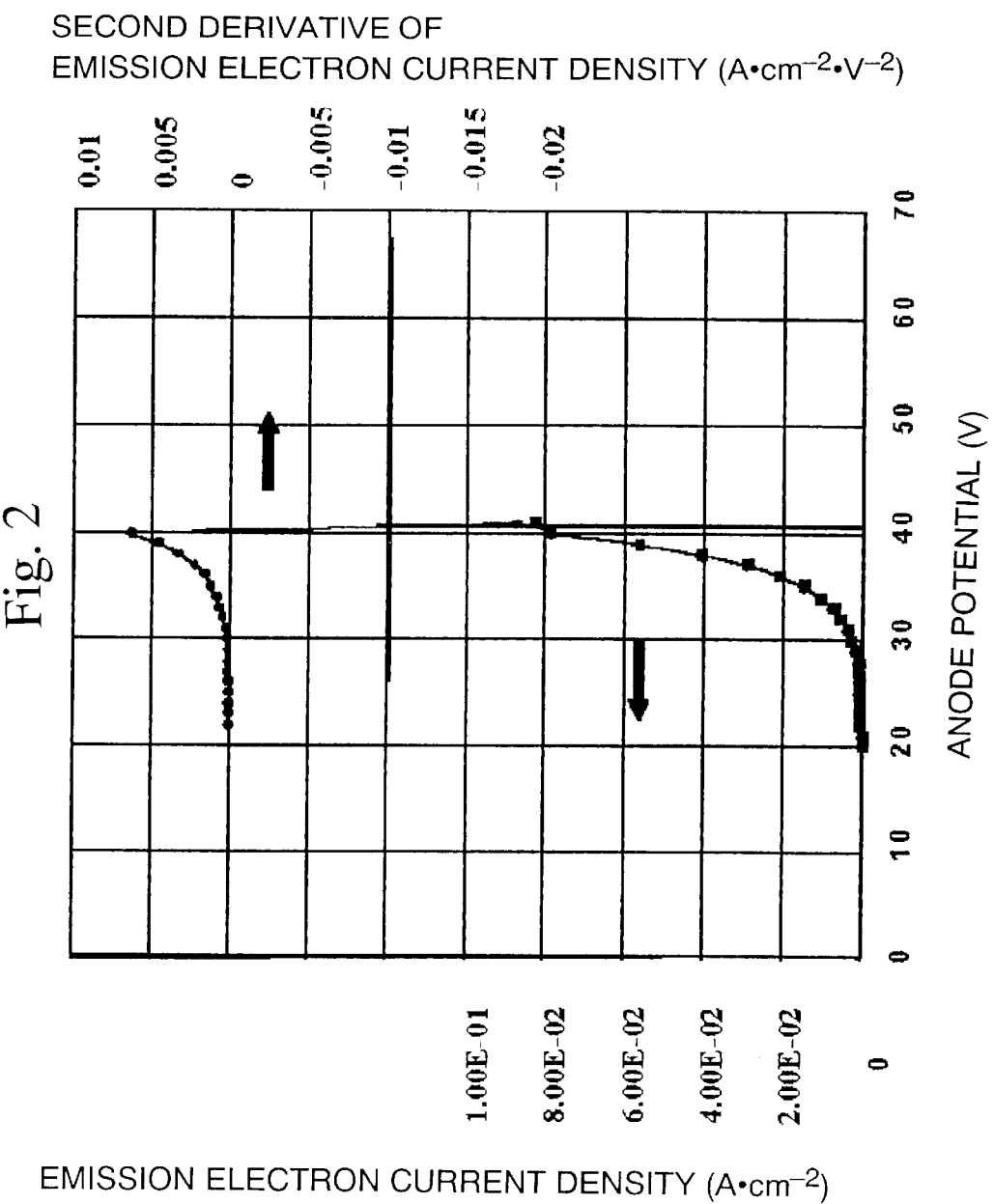
FIG. 2 is a diagram showing the potential current density characteristic according to the second embodiment of the present invention.

The second embodiment of the present invention is described below with reference to FIG. 2. FIG. 2 shows the result of the measurement of the electron emission current density based on the cathode current. The electron emission apparatus according to the second embodiment has a first feature in driving at a voltage, whose second derivative is larger than $-0.01$ ($A \cdot cm^{-2} \cdot V^{-2}$) and whose driving voltage is more than 42V.

Since the threshold value of the second derivative is set to be more than $-0.01$ ($A \cdot cm^{-2} \cdot V^{-2}$), the applied voltage, which is a little higher than the minimum value of the saturation tendency region, is applied to the apparatus. The second feature of this invention is that the upper limit of the time, during which the above described-voltage can be applied, corresponds to the value obtained by dividing a predetermined value T by the absolute value of the above-described second derivative. It is noted, however, that, when the second derivative is 0, then the time is set to have no limitation without executing the division.

Numeral examples for the upper limit of the time are shown below. It is assumed that $T=1\times10^{-8}$ ($sec \cdot cm^{-2} \cdot V^{-2} \cdot A$). When the second derivative is $-0.002$ ($A \cdot cm^{-2} \cdot V^{-2}$), the absolute value of the second derivative is 0.002. Thus, the time for electron emission is obtained by dividing the $1\times10^{-8}$ by 0.002 to obtain 5 microseconds. The value of T is an example obtained experimentally.

The relationship between the upper limit of the application time $t_{ap}$ and the second derivative A can be expressed by an equation shown below, provided that the minimum voltage of the saturation tendency region $E_{st}$ is equal to or less than the applied electric field E.

$$t_{ap}=T/|A|(E_{st} \leq E)$$

A variety of T values are obtained experimentally using the carbon nanotube, and the experimental results of T values fall within a range from $1\times10^{-9}$ to $1\times10^{-6}$ ($sec \cdot cm^{-2} V^{-2} \cdot A$). The degradation of the emission characteristics is not observed if the continuous application time does not exceed the limiting range determined by the use of T values.

Figure 3:
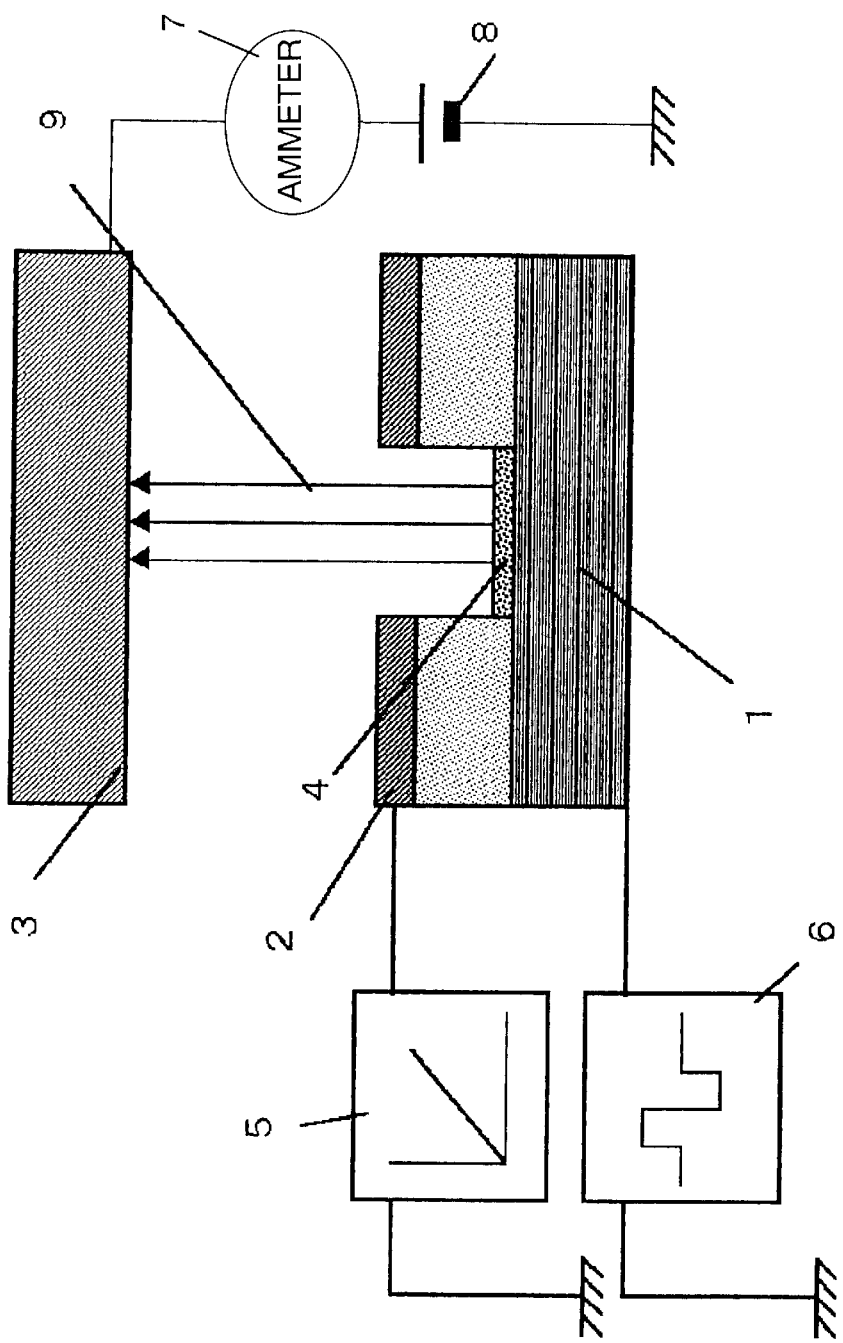
FIG. 3 shows a structure according to the fourth embodiment of the present invention.

The third embodiment of the present invention is described below with reference to FIGS. 3 and 4. FIG. 3 illustrates an example of the FED (Field emission Display) comprising three constituting elements of the cathode electrode (1), gate electrode (2), and anode electrode (3).

The carbon nanotube (4) is fixed on the cathode electrode, and the anode electrode is coated with a fluorescent material. The gate electrode is connected to an analog drive circuit (5), and the cathode electrode is connected to a pulse drive circuit (6). The anode electrode is connected to an ammeter (7) and a DC bias circuit (8). The distance from the reference surface of the upper surface of the cathode electrode to the lower surface of the gate electrode is 5 $\mu$m, the distance from the reference surface to the upper surface of the gate electrode is 10 $\mu$m, and the distance from the reference surface to the lower surface of the anode electrode is 1 mm. In another case, the distance from the reference surface to the upper surface of the gate electrode is 12 $\mu$m. The diameter of the gate hole is 4 $\mu$m. In one case, the diameter of the gate hole is 20 $\mu$m. The direction of the electron current is shown by the arrow (9).

In the circuit constitution shown in FIG. 3, the necessary potential for obtaining the desired amount of luminescence of FED is applied by the analog drive circuit. The cathode potential is assumed to be the ground potential. The cathode electrode is made to generate three different values (three valued pulses) in the vicinity of the ground potential. Both of the applied voltage from the analog drive circuit and the potential from the pulse drive circuit to the cathode electrode determine the amount of emitted electrons. The amounts of emitted electrons under various conditions are measured by an ammeter.

Figure 4:
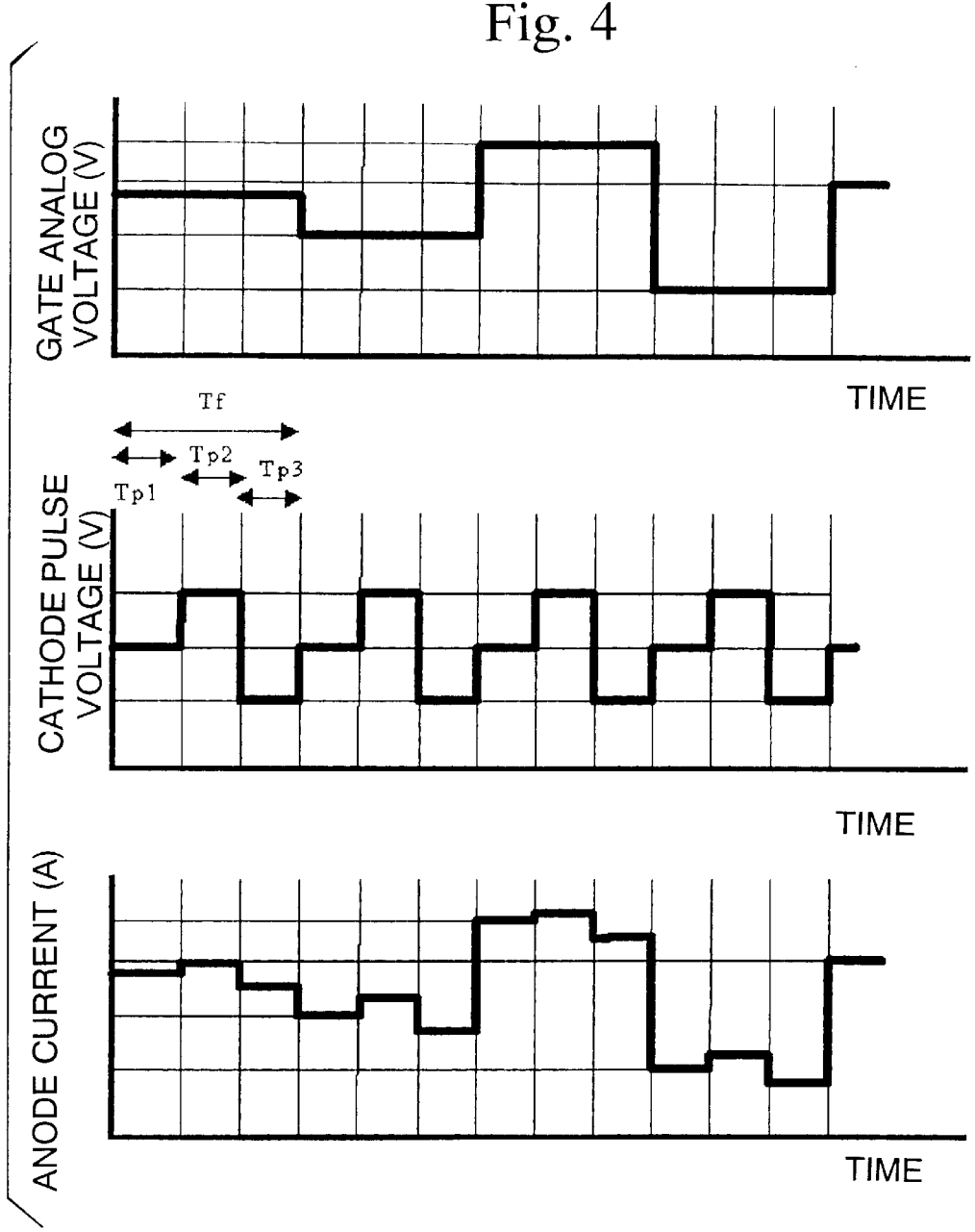
FIG. 4 is a timing chart for explaining the fourth and fifth embodiments of the present invention.

FIG. 4 is a timing chart representing the driving method shown in FIG. 3. One frame period of the FED is represented by Tf, and the period by dividing Tf into three is represented by Tp. The analog drive circuit outputs a constant value for the period of Tf, and the pulse drive circuit outputs a different value for each Tp. The pulse drive circuit outputs three values. The output potential in the first period of Tp1 is the ground potential, the output potential in the second period of Tp2 is a positive potential, and the output potential in the third period of Tp3 is a negative potential. An anode current is generated corresponding to this drive. Since three different potentials are applied within a period of Tf, the amounts of electron currents corresponding to the three different potentials are approximated by a secondary function and the saturation tendency is determined by obtaining the second derivative. The method for determining the saturation tendency region is as described above. In order to increase the accuracy of the measurement, the measurement is repeatedly carried out for more than 100 times.

The fourth embodiment of the present invention is described with reference again to FIG. 4. In the fourth embodiment, the luminescence characteristic of the FED is arranged by using a new application device of the pulse driving voltage to the cathode. The fluorescent material emits light at its own time constants when the fluorescent material is excited by an electron beam.

When the FED is used as a display panel in a monitor screen watched by users, the images are recognized by a combination of the after image effect of the human vision and the after image characteristics of the fluorescent material. By minimizing the time period of three partial times Tp1 to Tp3, users can see the image as a stable one, without having flicker. In order to minimize flicker of an image and to reproduce the brightness of the image, the pulse drive period is twice as short as before. That is, the period of time of Tf is divided into six sections from Tp1 to Tp6. In these six sections from Tp1 to Tp6, the applied potentials are varied from one interval to the other, and it is possible to provide a clear image without flicker by division into six sections, even when flickering may be recognized if Tf is only divided into three sections.

The fifth embodiment of the present invention is described below. Although the fifth embodiment resembles the fourth embodiment, the fifth embodiment operates by dividing the time period of Tf into six sections only when the brightness exceeds a certain brightness, and when the brightness is below a certain value, the time period of Tf is divided into three. This is because the human visual sensitivity is high for bright objects, but low for dark objects. This method has an object to provide a high image quality and a low power consumption by using high frequency driving only when the image output exceeds a certain threshold brightness. The threshold brightness value for high frequency driving is, for example, 80 candela/cm$^2$.

Figure 5:
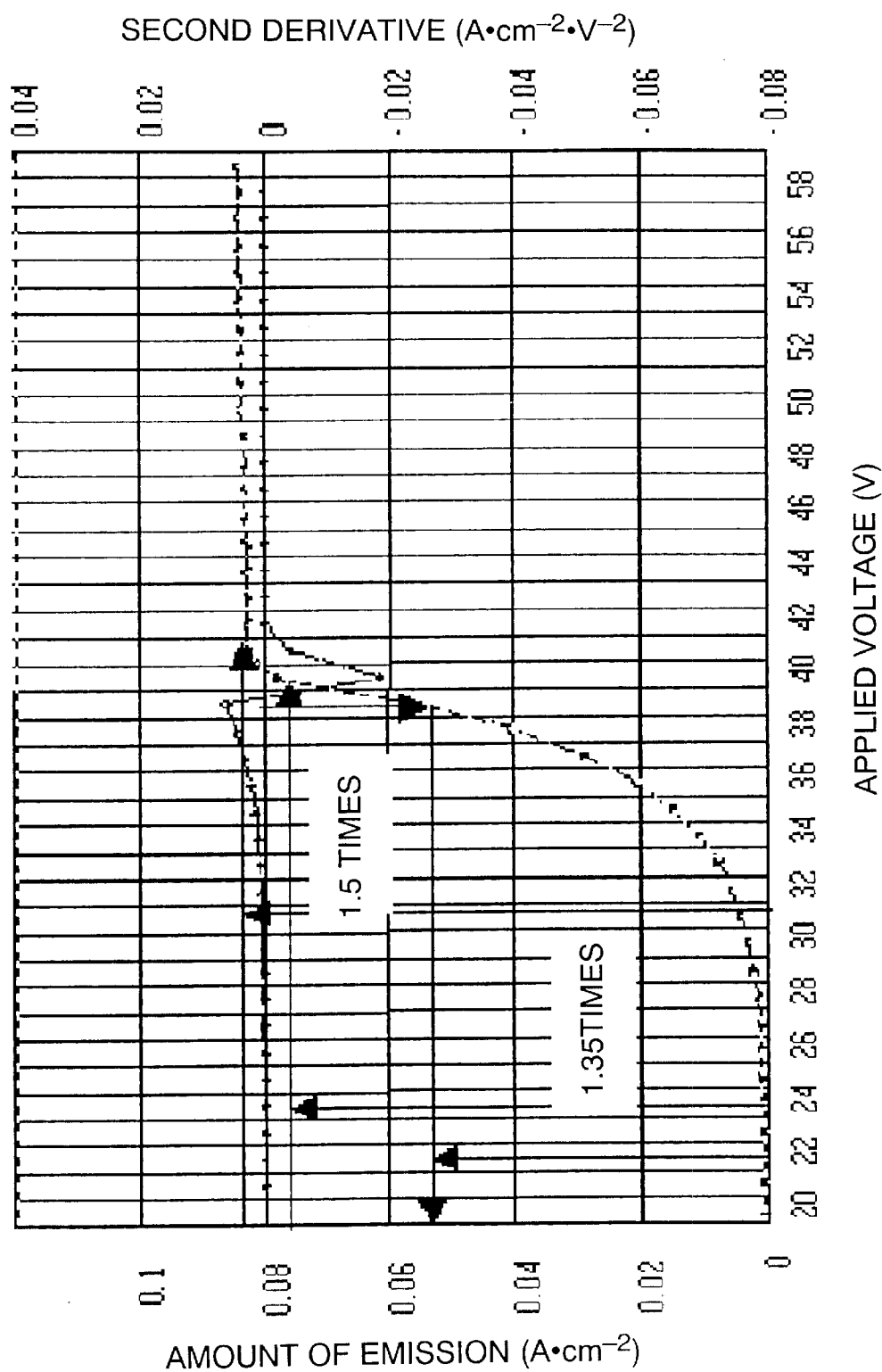
FIG. 5 is an analysis graph showing electron emission characteristics of a carbon nanotube.
Figure 6:
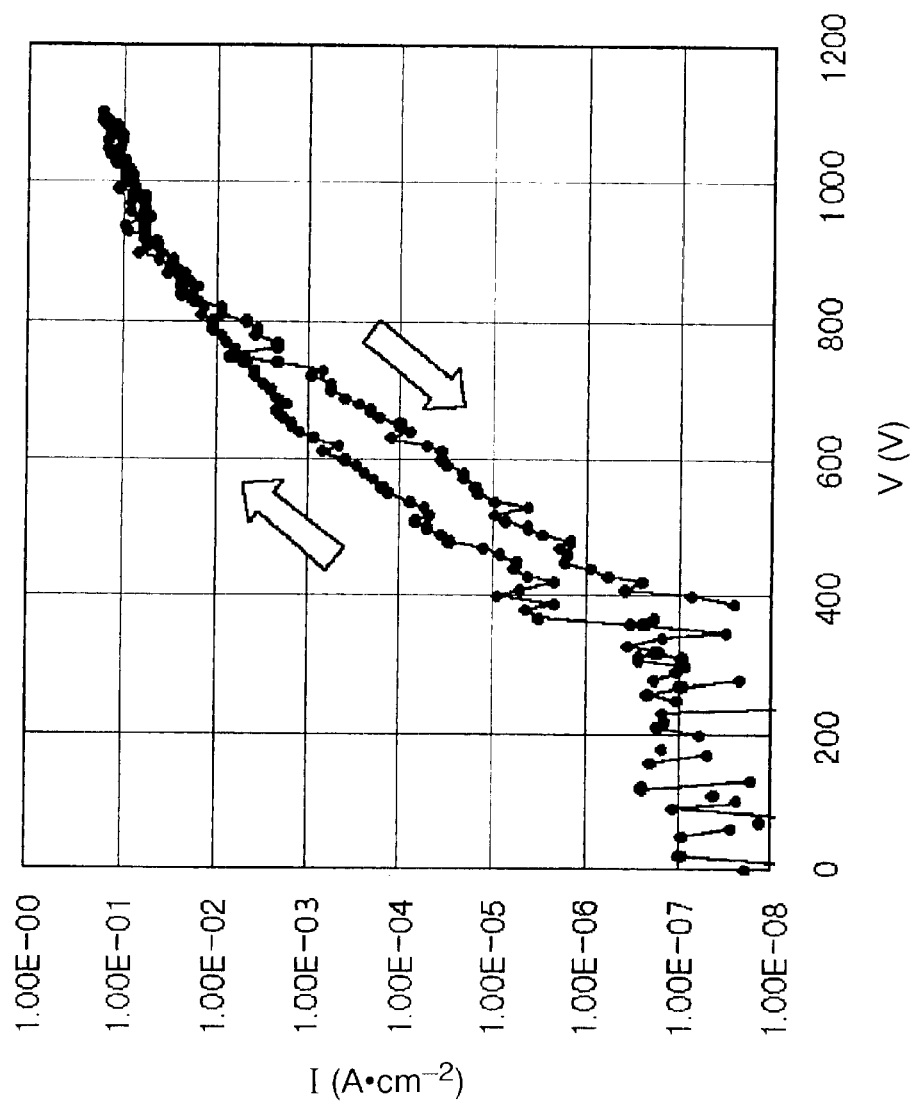
FIG. 6 is a graph showing the electron emission characteristics of a carbon nanotube.

The sixth embodiment of the present invention is described with reference to FIG. 5. As shown in FIG. 5, the second derivative becomes 0 at the applied voltage of 39.5V. The amount of emission current at that applied voltage is 0.057 A/cm$^2$. The allowable range of the emission current is determined when the emission current is less than 1.35 times of that emission current of 0.057 A/cm$^2$, that is, 0.077 A/cm$^2$. When determining the driving range, the limiting condition is that the third derivative of the emission current must be negative if the second derivative is 0. Since the remarkable saturation tendency is not observed in this range, it is possible to operate the apparatus without limiting the emission time.

The seventh embodiment of the present invention is described with reference to FIG. 5. The operation of this embodiment is carried out within a driving electric field wherein the emission current is less than 1.5 times the emission current of 0.057 A/cm$^2$, at which the second derivative becomes 0. Similar to the sixth embodiment, the present embodiment has a limiting condition based on the third derivative. The emission characteristic near 0.085 A/cm$^2$, which corresponds to 1.5 times the base emission current of 0.057 A/cm$^2$, is the point where the saturation tendency starts. In the region from 1.35 times to 1.5 times the base emission current of 0.057 A/cm$^2$, the emission characteristic show a slight degradation. That is, the emission current decreases as the emission time by the same applied voltages elapses. In the above-described region from 1.35 times to 1.5 times, the degradation increases in proportion to (N−1.35), when the multiplication factor is set to N. Thus, the allowable emission time is limited in proportion to the value of 1/(N−1.35).

As described above, several embodiments are described when the carbon nanotube is fixed on the cathode electrode. Similar to the above, the electron emission properties of DLC or the molybdenum cone can be obtained.

In the driving operation of the field electron emission apparatus called SCE (Surface Conductive Emitter), when an electric field exceeding a certain threshold voltage is applied between both driving electrodes, the electron emission characteristics tend to become saturated because of expansion of the gap between the islands of the electron emitter source of palladium oxide in the palladium oxide film in which the electron emitter source constitutes islands. The present invention can be applied to drive such a SCE. In driving this type of emitter material, an electrode having a comparatively high potential is represented as the anode or the gate electrode and the electrode having a comparatively low potential is represented as the cathode electrode.

The present invention has an effect that the present method is capable of preventing the degradation of electron emission in any cathode structure. Since it is known that the degradation of the electron emission characteristics is closely related with the application of an electric potential in the saturation tendency region, the degradation can be prevented by adopting a method of driving capable of detecting the saturation tendency even when the electron emission current varies due to the change of the cathode area without requiring a change of the circuit.

What is claimed is:

1. A method for driving an electric field electron emission apparatus which emits electron by electric field emission from the cathode electrode and captures electrons at the anode electrode, wherein the electric field applied to the cathode electrode is higher than that for generating the field emission and lower than the electric field in which the second derivative of the density of the electron current (hereinafter called the electron current density) to be captured at the cathode electrode with respect to the cathode electrode becomes 0 for the first time after the electric field is applied.

2. A method of driving an electric field electron emission apparatus, in which electrons emitted from a cathode electrode by the field emission is captured by an anode electrode, wherein the electric field applied to said cathode electrode is higher than the electric field for generating the field emission of electrons, and the second derivative of the density of the electron current (hereinafter, called the electron current density) captured by the anode electrode for the electric field is higher than the electric field in which said second derivative becomes 0 for the first time after the electric field is applied, and wherein the period of time during which the electric field is applied to the cathode electrode satisfies the following two equations:

$$t_{ap}=T/|A|$$

$$E_{st} \leq E$$

where,

T: a numeral value within a range higher than $1\times10^{-9}$ and lower than $1\times10^{-6}$ [sec·cm$^{-2}$·V$^{-2}$·A], A: the second derivative of the electron current density [A·cm$^{-2}$·V$^{-2}$], E: the electric field applied to the cathode electrode, and $E_{st}$: the minimum electric field in a saturation tendency region, wherein, the minimum electric field in the saturation tendency region is the electric field at which a change of the electron current density changes from an increase to a decrease.

* * * * *